(12) United States Patent
Lee et al.

(10) Patent No.: US 11,305,679 B2
(45) Date of Patent: Apr. 19, 2022

(54) ARMREST APPARATUS AND VARIOUS ROTATING ANGLES FOR VEHICLE AND METHOD FOR CONTROLLING OPERATION THEREOF

(71) Applicants: HYUNDAI MOTOR COMPANY, Seoul (KR); KIA MOTORS CORPORATION, Seoul (KR)

(72) Inventors: Hong Heui Lee, Suwon-si (KR); Myung Hoe Kim, Seoul (KR); Eun Sue Kim, Hwaseong-si (KR); Seung Sik Han, Hwaseong-si (KR); Tae Hyung Kim, Siheung-si (KR); Sun Ho Hur, Seoul (KR); Sang Yong Koo, Incheon (KR); Dong Kyu Lee, Ansan-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 0 days.

(21) Appl. No.: 16/994,893

(22) Filed: Aug. 17, 2020

(65) Prior Publication Data

US 2021/0261029 A1  Aug. 26, 2021

(30) Foreign Application Priority Data

Feb. 24, 2020 (KR) .................. 10-2020-0022070

(51) Int. Cl.
*B60N 2/75* (2018.01)

(52) U.S. Cl.
CPC ............... *B60N 2/77* (2018.02); *B60N 2/767* (2018.02); *B60N 2/797* (2018.02)

(58) Field of Classification Search
CPC ........... B60N 2/77; B60N 2/767; B60N 2/797
See application file for complete search history.

(56) References Cited

U.S. PATENT DOCUMENTS

| 4,496,190 | A | * | 1/1985 | Barley | B60N 2/767 |
| | | | | | 297/411.38 |
| 5,169,207 | A | * | 12/1992 | Rye | A47C 7/541 |
| | | | | | 297/411.33 |
| 5,678,896 | A | * | 10/1997 | Chung | A47C 1/03 |
| | | | | | 297/411.38 |
| 7,600,819 | B2 | * | 10/2009 | Armo | B60N 2/767 |
| | | | | | 297/411.35 |
| 9,481,466 | B2 | * | 11/2016 | Fischer | B64D 11/064 |
| 10,486,567 | B2 | * | 11/2019 | Roeglin | B60N 2/22 |
| 10,814,762 | B2 | * | 10/2020 | Faccin | B60N 2/753 |
| 2018/0304789 | A1 | * | 10/2018 | Robert | B60N 2/773 |

(Continued)

FOREIGN PATENT DOCUMENTS

JP H04-16948 U 2/1992
JP 2013-244862 A 12/2013

(Continued)

*Primary Examiner* — Philip F Gabler

(74) *Attorney, Agent, or Firm* — Morgan, Lewis & Bockius LLP

(57) ABSTRACT

An armrest apparatus for a vehicle includes: a lower arm located on a side surface of a seat and configured to rotate with respect to the seat by power of a lower arm motor; and an upper arm extending along a lengthwise direction of the lower arm and configured to rotate with respect to the lower arm by power of an upper arm motor.

19 Claims, 13 Drawing Sheets

(56) References Cited

U.S. PATENT DOCUMENTS

2019/0077288 A1\* 3/2019 Gayon .................. B60N 2/773
2019/0184875 A1   6/2019 Gomez et al.

FOREIGN PATENT DOCUMENTS

| JP | 2014-19212 A | 2/2014 |
| JP | 2017-136994 A | 8/2017 |
| KR | 10-2004-0096104 A | 11/2004 |
| KR | 10-2010-0066722 A | 6/2010 |

\* cited by examiner

FIG. 4

| Type | Armrest mode |
|---|---|
| Standard posture of seat | Standard mode |
| Relax posture of seat | Relax mode |
| Accident occurrence situation | Side airbag deployment mode |
| Getting-in situation | Getting-in mode |

ARMREST APPARATUS AND VARIOUS ROTATING ANGLES FOR VEHICLE AND METHOD FOR CONTROLLING OPERATION THEREOF

CROSS-REFERENCE TO RELATED APPLICATION

This application claims the benefit of priority to Korean Patent Application No. 10-2020-0022070, filed on Feb. 24, 2020, in the Korean Intellectual Property Office, the disclosure of which is incorporated herein by reference.

TECHNICAL FIELD

The present disclosure relates to an armrest apparatus for a vehicle and a method for controlling an operation thereof, and more particularly, to an armrest apparatus for a vehicle, an angle of which is variously changed according to a posture of a seat, an accident occurrence situation, and a getting-in situation, and a method for controlling an operation thereof.

BACKGROUND

A vehicle is provided with seats for passengers to sit, and the seats are provided with armrests for improving a riding feeling by holding arms of the seated passengers on the seats of the vehicle.

One arm member is coupled to a seat of a conventional armrest to be simply rotatable, and in particular, the angle of the armrest may be adjusted by rotating the armrest by a seated passenger. Thus, the installation angle of the armrest cannot be variously realized according to the seating posture of the passenger and it is inconvenient to manipulate the armrest manually.

Further, in the armrest of the vehicle seat, an interference with a side airbag deployed from a seat in the case of an accident should be excluded. In particular, an interference with a passenger should be excluded when the passenger gets in the vehicle, and the conventional armrest cannot realize the modes automatically.

The items described as the background technologies are provided only for improvement of understanding of the background of the present disclosure, and should not be understood that it is admitted that the items correspond to the conventional technology that are known to those skilled in the art to which the present disclosure pertains.

SUMMARY

The present disclosure provides an armrest apparatus for a vehicle, an angle of which can be variously changed according to a standard posture and a relax posture of a seat, a collision accident occurrence situation, and a getting-in situation, and a method for controlling an operation thereof, thus improving the convenience of the user and the product value by expanding the useful functions of the armrest.

Further, the armrest according to the present disclosure can be efficiently applied to a seat provided in an autonomous vehicle.

According to an aspect of the present disclosure, an armrest apparatus for a vehicle may include: a lower arm located on a side surface of a seat and configured to rotate with respect to the seat by power of a lower arm motor; and an upper arm extending along a lengthwise direction of the lower arm and configured to rotate with respect to the lower arm by power of an upper arm motor.

The lower arm motor may be coupled to a motor bracket, the motor bracket is fixedly coupled to a side surface of a seat frame, and the lower arm may rotate with respect to the seat on a side surface of the seat when a motor shaft of the lower arm motor is coupled to the lower arm to rotate.

The lower arm motor may protrude to one side of the lower arm, and the lower arm motor protruding to the one side of the lower arm may be covered by a seat shield side cover coupled to the seat to be prevented from being exposed to the outside.

The upper arm motor may be coupled to the lower arm, and a motor shaft of the upper arm motor may be coupled to the upper arm such that the upper arm rotates with respect to the lower arm when the motor shaft of the upper arm motor rotates.

The upper arm motor may be coupled to the lower arm to be located in an empty space in the interior of the lower arm so as to be prevented from being exposed to the outside, and the motor shaft of the upper arm motor passes through the lower arm to be integral with the upper arm through a coupling nut.

Operations of the lower arm motor and the upper arm motor may be individually controlled by a seat controller.

The armrest apparatus may further include a mobile device cradle provided in the upper arm, and the mobile device cradle may be embedded in the upper arm and then may be operated to protrude to the front side along a lengthwise direction of the upper arm, and a mobile device may be cradled and charged by using the mobile device cradle protruding to the front side of the upper arm.

According to another aspect of the present disclosure, a method for controlling an operation of the armrest apparatus may include: generating a standard posture signal of the seat through control of a seat switch; and arranging the armrest in a standard mode by setting the angles of the lower arm and the upper arm to preset angles by, by the seat controller, individually controlling the operations of the lower arm motor and the upper arm motor when the standard posture signal is generated.

The method may further include a standard posture of the seat corresponds to a state in which a seatback rotates to the rear side by an angle within 45 degrees with respect to a vertical line that is perpendicular to a ground surface, the standard mode of the armrest corresponds to a state in which the lower arm rotates to the front side by an angle within 45 degrees with respect to the vertical line and the upper arm rotates toward the front side while the included angle between the upper arm and the lower arm is an obtuse angle.

According to another aspect of the present disclosure, a method for controlling an operation of the armrest apparatus may include: generating a relax posture signal of the seat through control of a seat switch; and arranging the armrest in a relax mode by setting the angles of the lower arm and the upper arm to preset angles by, by the seat controller, individually controlling the operations of the lower arm motor and the upper arm motor when the relax posture signal is generated.

The method may further include a relax posture of the seat corresponds to a state in which a seatback rotates to the rear side by an angle of not less than 60 degrees and not more than 90 degrees with respect to a vertical line that is perpendicular to a ground surface, and the relax mode of the armrest corresponds to a state in which the lower arm rotates by an angle that is the same as the angle of the seatback and the upper arm rotates toward the front side while the included angle between the upper arm and the lower arm is an acute angle of not less than 30 degrees and not more than 45 degrees.

According to another aspect of the present disclosure, a method for controlling an operation of the armrest apparatus may include: detecting an approach of a surrounding vehicle by using a collision sensor of the vehicle while the vehicle travels; generating a collision danger signal before a collision accident occurs when a vehicle controller that received a signal of the collision sensor determines a danger of a collision accident; and arranging the armrest in a side airbag deployment mode by setting the angles of the lower arm and the upper arm to preset angles by, by the seat controller, individually controlling the operations of the lower arm motor and the upper arm motor when the collision danger signal is generated.

When the collision danger signal is generated, the armrest may be completely arranged in the side airbag deployment mode before a collision accident occurs.

The method may further include: continuing the side airbag deployment mode, by the armrest, when a side airbag is operated within a predetermined period of time after the armrest is completely arranged in the side airbag deployment mode; and changing the side airbag deployment mode to the standard mode through an operation by control of the seat controller, by the armrest, when the side airbag is not operated within a predetermined period of time after the armrest is completely arranged in the side airbag deployment mode.

The collision sensor may include one or more of an airbag sensor, a radar system, a LIDAR system, and a camera, and the vehicle controller may generate a collision danger signal when the surrounding vehicle approaches the vehicle by a preset distance or less.

The side airbag deployment mode of the armrest may correspond to a state in which the armrest rotates to avoid a deployment area of the side airbag deployed from a side surface of the seatback, and may correspond to a state in which the lower arm and the upper arm extend in a straight line along a femoral region of a seated passenger while being located on a side of the femoral region and an end of the upper arm rotates to face the front side.

The standard mode of the armrest may correspond to a state in which the lower arm rotates to the front side by an angle within 45 degrees with respect to a vertical line that is perpendicular to a ground surface, and may correspond to a state in which the upper arm rotates toward the front side while the included angle between the upper arm and the lower arm is an obtuse angle.

According to another aspect of the present disclosure, a method for controlling an operation of the armrest apparatus may include: generating a door opening signal through an operation of a door switch in a stop state of the vehicle; and arranging the armrest in a getting-in mode by setting the angles of the lower arm and the upper arm to preset angles by, by the seat controller, individually controlling the operations of the lower arm motor and the upper arm motor when the door opening signal is generated.

The method may further include: determining whether a passenger is seated on a seat, by the seat controller, by using a signal of a weight sensor provided in the seat for a predetermined period of time after the armrest is completely arranged in the getting-in mode; and when the seat controller determines that the passenger is seated, changing the getting-in mode of the armrest to a standard mode through an operation by control of the seat controller.

The method may further include: determining whether a passenger is seated on a seat, by the seat controller, by using a signal of a weight sensor provided in the seat for a predetermined period of time after the armrest is completely arranged in the getting-in mode; when the seat controller determines that a passenger is not seated in the seat, continuing the getting-in mode of the armrest through control of the seat controller; and when a door closing signal is generated through an operation of a door switch in a situation in which the armrest continues the getting-in mode while a passenger is not seated in the seat, changing the getting-in mode of the armrest to a standard mode through an operation by control of the seat controller.

The getting-in mode of the armrest may correspond to a state in which the armrest rotates to an area in which the armrest does not interfere with a passenger when the passenger moves to a direction in which the passenger is seated in the seat from a side surface of the seat, and may correspond to a state in which the lower arm and the upper arm extend in a straight line along a direction in which a seatback stands uprights while being located on a side of the seatback standing vertically and an end of the upper arm rotates to face the upper side.

The standard mode of the armrest may correspond to a state in which the lower arm rotates to the front side by an angle within 45 degrees with respect to a vertical line that is perpendicular to a ground surface, and may correspond to a state in which the upper arm rotates toward the front side while the included angle between the upper arm and the lower arm is an obtuse angle.

According to the present disclosure, the angle of the armrest apparatus is automatically changed variously according to a standard posture and a relax posture of the seat of the vehicle, a collision accident situation of the vehicle, and a getting-in situation of a passenger, and through this, the convenience of the user and the product value can be improved by expanding the useful functions of the armrest.

Further, according to the present disclosure, the armrest apparatus also may be applied to a seat of an autonomous vehicle that can realize a relax mode, in which a driver comfortably takes a rest while not directly driving the vehicle during driving of the vehicle.

BRIEF DESCRIPTION OF THE DRAWINGS

The above and other aspects, features and advantages of the present disclosure will be more apparent from the following detailed description taken in conjunction with the accompanying drawings, in which:

FIGS. 4 and 5 are a table and a schematic diagram for explaining modes to which an armrest apparatus is converted for types according to an exemplary embodiment of the present disclosure;

DETAILED DESCRIPTION

Figure 1:
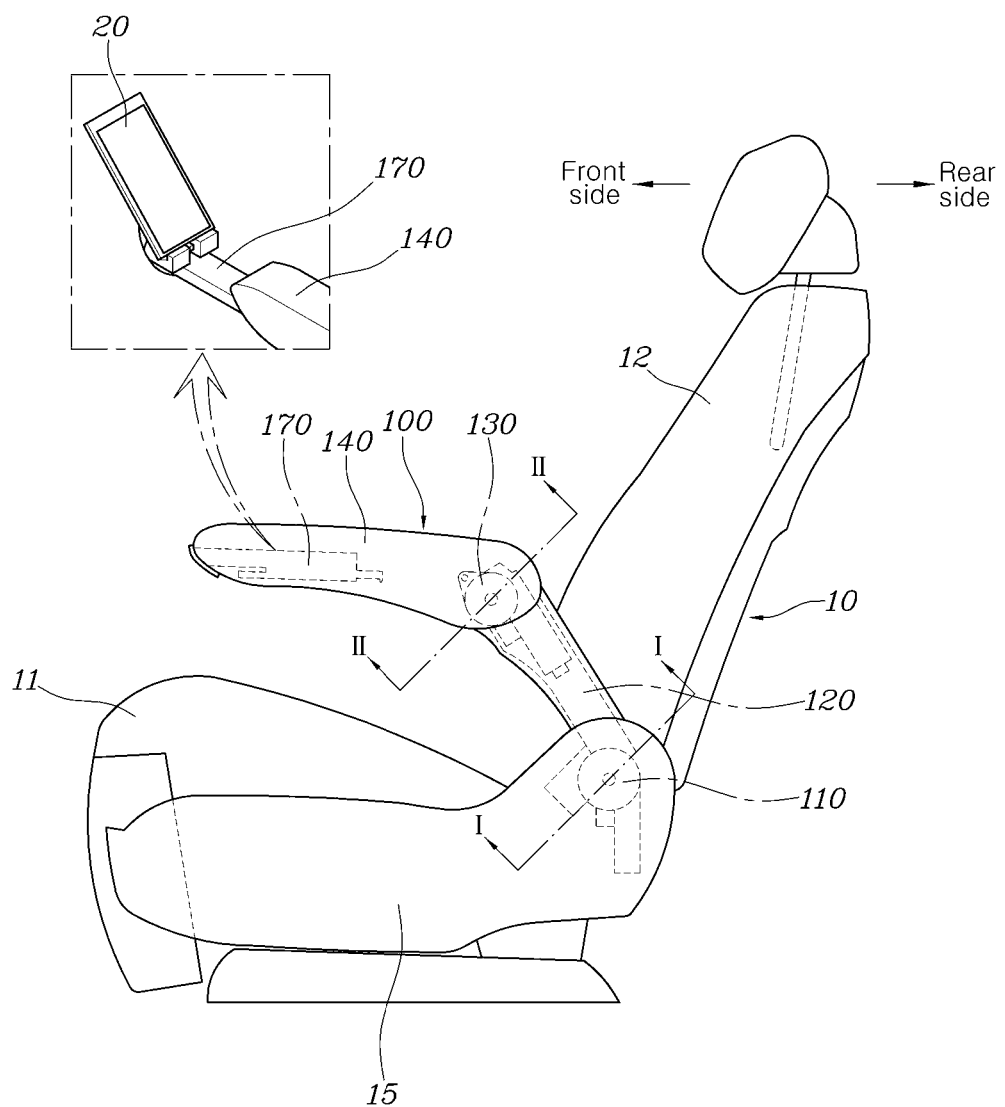
FIG. 1 is a side view of a seat of a vehicle provided with an armrest apparatus according to an exemplary embodiment of the present disclosure.

A specific structural or functional description of embodiments of the present disclosure disclosed in the specification or application is given merely for the purpose of describing the embodiment according to the present disclosure. Therefore, the embodiments according to the present disclosure may be implemented in various forms, and the present disclosure should not be construed as being limited to the embodiments described in the specification or application.

Various changes and modifications may be made to the embodiments according to the present disclosure, and therefore particular embodiments will be illustrated in the drawings and described in the specification or application. However, it should be understood that embodiments according to the concept of the present disclosure are not limited to the particular disclosed embodiments, but the present disclosure includes all modifications, equivalents, and alternatives falling within the spirit and scope of the present disclosure.

Although the terms "ordinal numbers" such as first, second and the like may be used to describe various elements, the elements should not be defined by the terms. The terms are merely used to distinguish an element from another element, and thus a first element may be named a second element while the second element may be similarly named the first element, without departing from the scope of protection according to the concept of the present disclosure.

In the case where an element is referred to as being "connected" or "accessed" to other elements, it should be understood that not only the element is directly connected or accessed to the other elements, but also another element may exist between them. Contrarily, in the case where a component is referred to as being "directly connected" or "directly accessed" to another component, it should be understood that there is no component therebetween. The other expressions of describing a relation between structural elements, i.e., "between" and "merely between" or "neighboring" and "directly neighboring", should be interpreted similarly to the above description.

In the present specification, the terms are merely used to describe a specific embodiment, and are not intended to limit the present disclosure. As used herein, the singular forms are intended to include the plural forms as well, unless the context clearly indicates otherwise. In the description, it should be understood that the terms "include" or "have" indicate existence of a feature, a number, a step, an operation, a structural element, parts, or a combination thereof, and do not previously exclude the existences or probability of addition of one or more another features, numeral, steps, operations, structural elements, parts, or combinations thereof.

Unless defined differently, all terms used herein, which include technical terminologies or scientific terminologies, have the same meaning as that generally understood by a person skilled in the art to which the present disclosure belongs. It should be interpreted that the terms, which are identical to those defined in general dictionaries, have the meaning identical to that in the context of the related technique. The terms should not be ideally or excessively interpreted as a formal meaning unless not clearly defined.

Hereinafter, an armrest apparatus for a vehicle and a method for controlling an operation thereof according to exemplary embodiments of the present disclosure will be described with reference to the accompanying drawings.

A control unit, e.g., controller or electronic control unit (ECU), according to an exemplary embodiment of the present disclosure may be implemented by an algorithm configured to control operations of various elements of the vehicle, a nonvolatile memory (not illustrated) configured to store data on a software instruction for reproducing the algorithm, and a processor (not illustrated) configured to perform an operation, which will be described below, by using the data stored in the memory. Here, the memory and the processor may be implemented by individual chips. Alternatively, the memory and the processor may be implemented by an integrated single chip. The processor may take the form of one or more processors.

Figure 2:
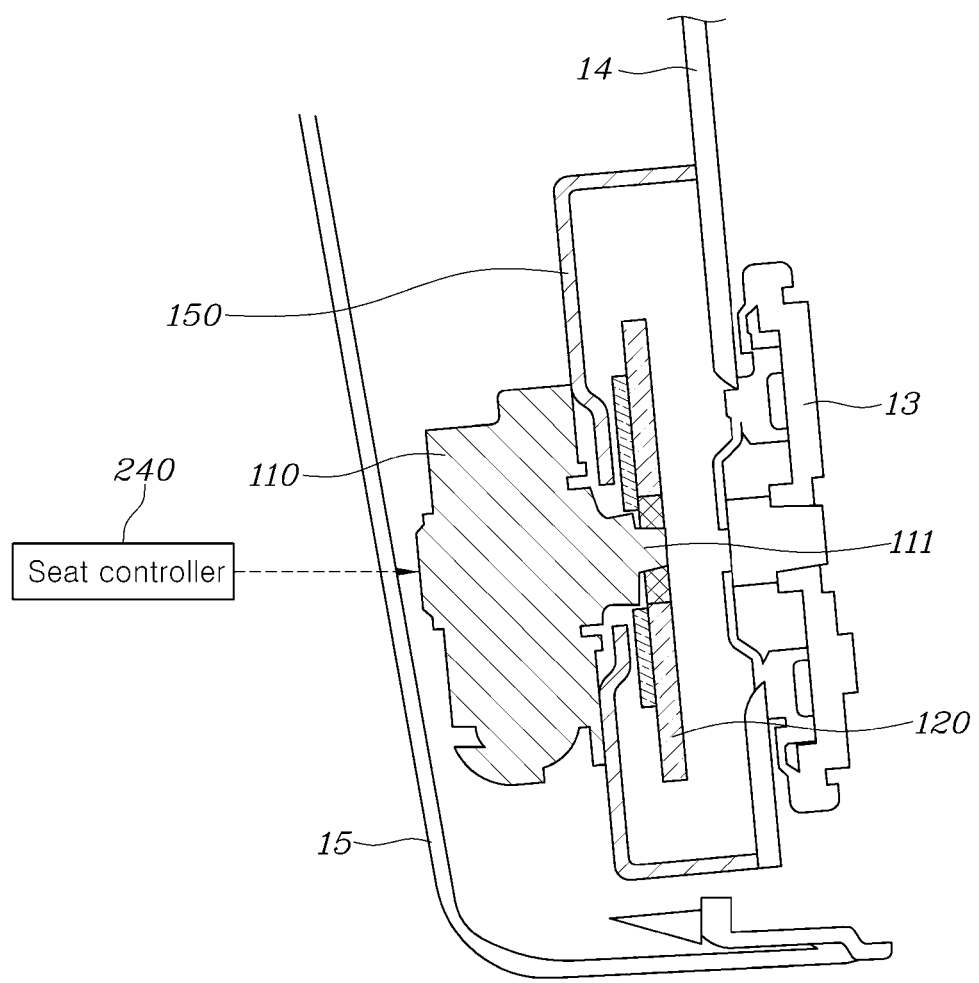
FIGS. 2 and 3 are cross-sectional views of portions, at which a lower arm motor and an upper arm motor are installed, according to an exemplary embodiment of the present disclosure and are cross-sectional views taken along line I-I and line II-II of FIG. 1.
Figure 3:
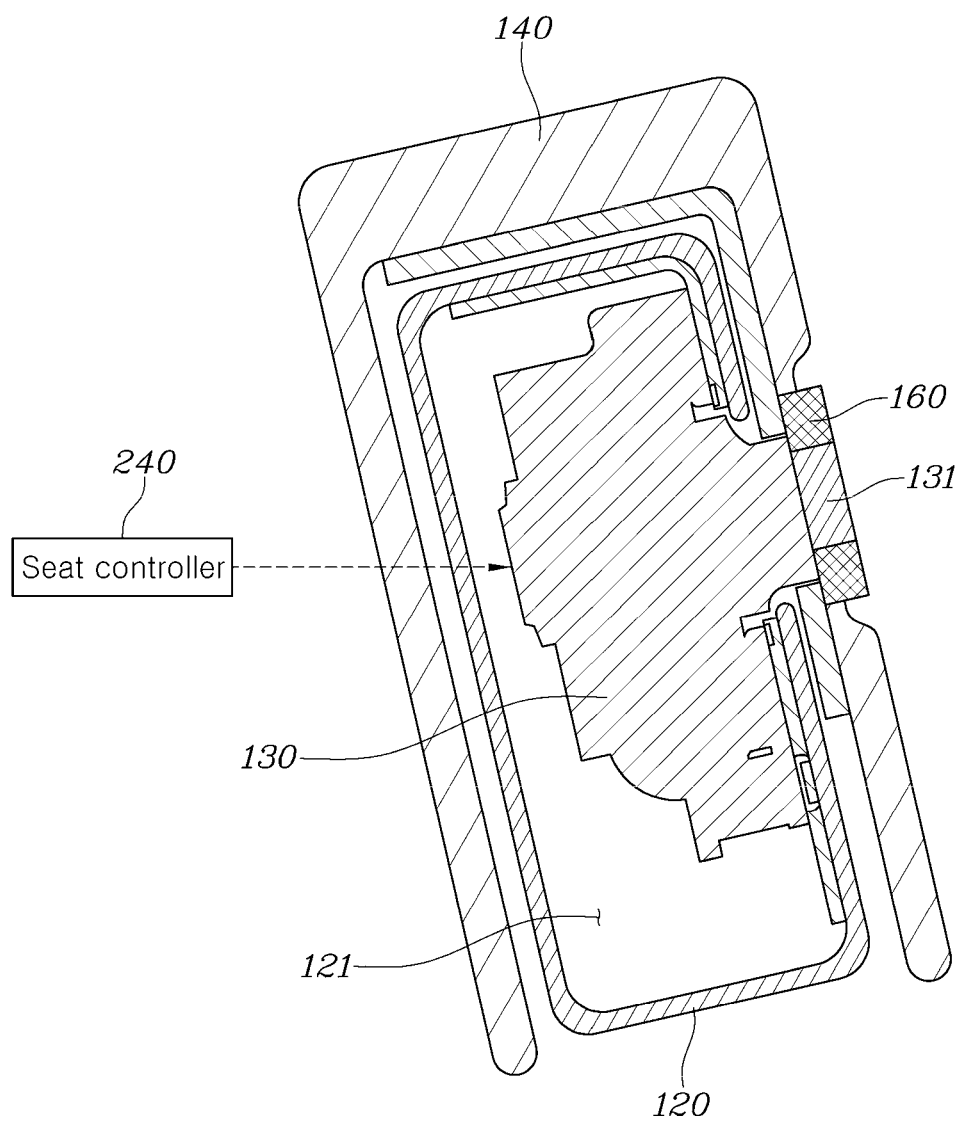

An armrest apparatus 100 according to an exemplary embodiment of the present disclosure, as illustrated in FIGS. 1 to 3, includes a lower arm 120 located on a side surface of a seat 10 of a vehicle and operated to rotate with respect to the seat 10 with power of a lower arm motor 110, and an upper arm 140 extending along a lengthwise direction of the lower arm 120 and operated to rotate with respect to the lower arm 120 with power of an upper arm motor 130.

The seat 10 of the vehicle includes a seat cushion 11, and a seatback 12. An angle of the seatback 12 can be adjusted when the seatback rotates forwards and rearwards with respect to the seat cushion 11, and the rotation of the seatback 12 may be made by a reclining device 13.

Both of the lower arm 120 and the upper arm 140 extend in a straight line.

As illustrated in FIG. 2, the lower arm motor 110 is coupled to a motor bracket 150, the motor bracket 150 is fixedly coupled to a side surface of a seat frame 14 that constitutes a frame of the seat 10, and a motor shaft 111 of the lower arm motor 110 is coupled to the lower arm 120 such that the lower arm 120 rotates with respect to the seat 10 on a side of the seat 10 if the motor shaft 111 of the lower arm motor 110 rotates. Here, the seat frame 14, to which the motor bracket 150 is coupled, may be a cushion frame of the seat.

The lower arm motor 110 coupled to be located on one side of the seat frame 14 by the motor bracket 150 protrudes to one side of the lower arm 120, and the lower arm motor 110 protruding to one side of the lower arm 120 is covered by a seat shield side cover 15 coupled to the seat 10 to be prevented from being exposed to the outside, and thus, an external appearance of the armrest apparatus can be improved.

The seat shield side cover 15 is coupled to a side surface of the seat cushion 11.

As illustrated in FIG. 3, the upper arm motor 130 is coupled to the lower arm 120, and a motor shaft 131 of the upper arm motor 130 is coupled to the upper arm 140 such that the upper arm 140 rotates with respect to the lower arm 120 if the motor shaft 131 of the upper arm motor 130 rotates.

According to an exemplary embodiment of the present disclosure, the upper arm motor 130 is coupled to the lower arm 120 to be located in an empty space 121 in the interior of the lower arm 120 to be prevented from being exposed to the outside, and through this, an external appearance of the armrest apparatus can be improved. In particular, the motor shaft 131 of the upper arm motor 130 passes through the lower arm 120, a coupling nut 160 is coupled to a tip end of the motor shaft 131 that passed through the lower arm 120, and the motor shaft 131 and the upper arm 140 are coupled to each other to be integral by a coupling force of the coupling nut 160 during the coupling of the coupling nut 160.

Accordingly, if the motor shaft 131 of the upper arm motor 130 rotates, the upper arm 140 coupled to the motor shaft 131 through the coupling nut 160 rotates with respect to the lower arm 120.

The lower arm motor 110 and the upper arm motor 130 according to an exemplary embodiment of the present disclosure are controlled to be individually operated by the seat controller 240.

The armrest apparatus according to an exemplary embodiment of the present disclosure further includes a mobile device cradle 170 provided in the upper arm 140, and the mobile device cradle 170 is embedded in the upper arm 140 and then is operated to protrude to the front side along a lengthwise direction of the upper arm 140, and a mobile device 20 is cradled and/or charged by using the mobile device cradle 170 protruding to the front side of the upper arm 140, and thus, the convenience of a passenger can be further improved.

According to an exemplary embodiment of the present disclosure, the angle of the above-configured armrest apparatus 100 is changed variously according to a posture (a standard posture and a relax posture) of the seat of the vehicle, a collision accident situation of the vehicle, and a riding situation of a passenger, and therefore, the convenience of the user and the product value can be improved by expanding the useful functions of the armrest.

As illustrated in FIG. 4, if the seat 10 of the vehicle is maintained largely in the standard posture and the relax posture, the mode of the armrest apparatus 100 provided in the seat 10 is automatically changed to the standard mode and the relax mode.

The standard posture of the seat 10 may be defined as the location and the state of the seat when a driver directly drives the vehicle, and the relax posture of the seat 10 may be defined as the location and the state of the seat when a driver takes a rest while not driving the vehicle in an autonomous vehicle.

Further, if there is a danger of a collision accident during driving of the vehicle, the mode of the armrest apparatus 100 is automatically changed to a side airbag deployment mode shortly before an accident occurs, and if a passenger gets in the vehicle in a stop state of the vehicle, the mode of the armrest apparatus 100 is automatically changed to a getting-in mode before the passenger gets in the vehicle.

Figure 5:
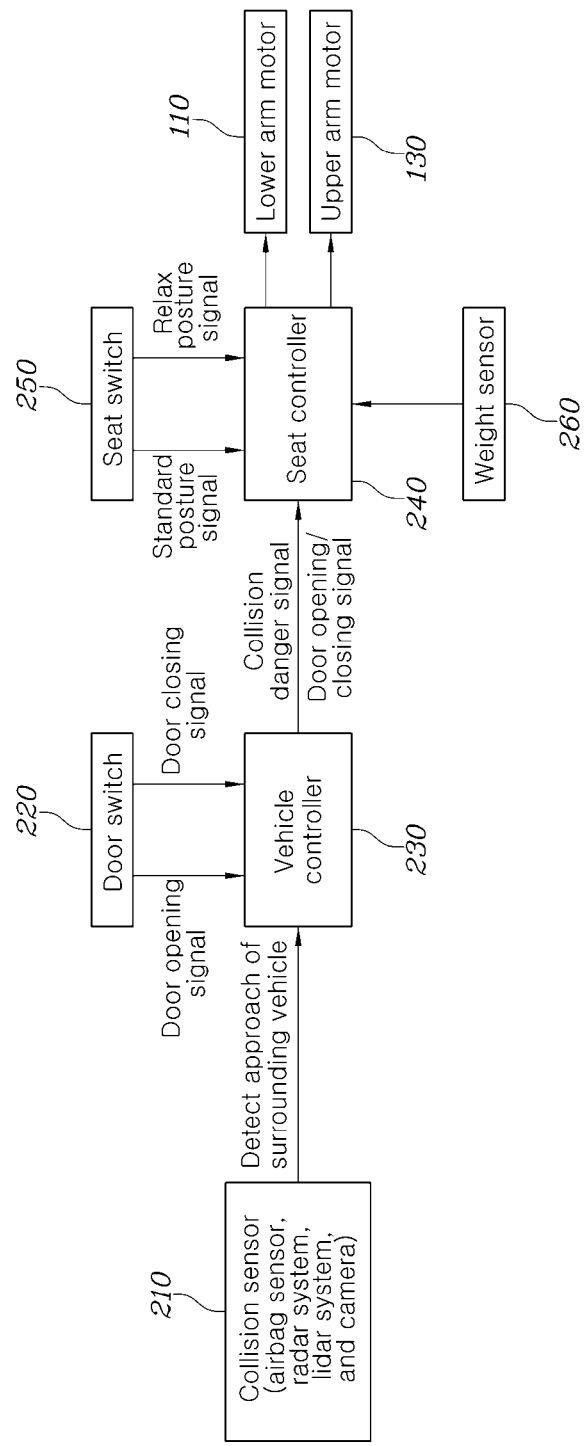

For an automatic operation of the armrest apparatus 100, an exemplary embodiment of the present disclosure, as illustrated in FIG. 5, includes a collision sensor 210, a door switch 220, a vehicle controller 230, a seat controller 240, a seat switch 250, and a weight sensor 260.

Figure 6:
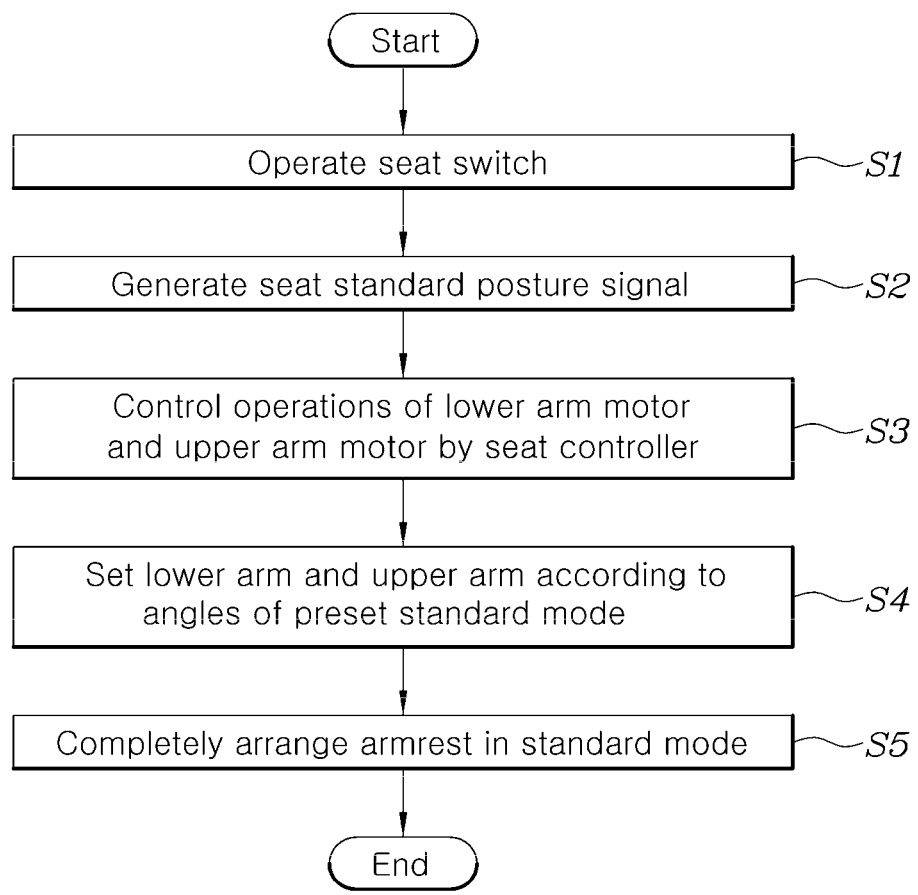
FIGS. 6 and 7 are a flowchart and an operational state view for explaining a situation in which the armrest apparatus is arranged in a standard mode according to an exemplary embodiment of the present disclosure.

First, a configuration of arranging the armrest apparatus 100 in a standard mode when the seat 10 maintains the standard posture will be described with reference to FIG. 6.

If a standard posture signal of the seat 10 is generated (step S2) as a passenger manipulates the seat switch 250 (step S1), the seat controller 240 individually controls operations of the lower arm motor 110 and the upper arm motor 130 (step S3).

If the standard posture signal of the seat 10 is generated by manipulating the seat switch 250, the seat controller 240 calculates the locations of the lower arm 120 and the upper arm 140 and angles that are necessary for rotations of the lower arm 120 and the upper arm 140 by utilizing Hall sensors of the lower arm motor 110 and the upper arm motor 130.

If the lower arm motor 110 and the upper arm motor 130 are operated according to the control of the seat controller 240, the lower arm 120 and the upper arm 140 rotate to be set according to the angles of the standard mode set by the seat controller 240 (step S4), and by this, the armrest 100 can be arranged to be in the standard mode completely (step S5).

Figure 7:
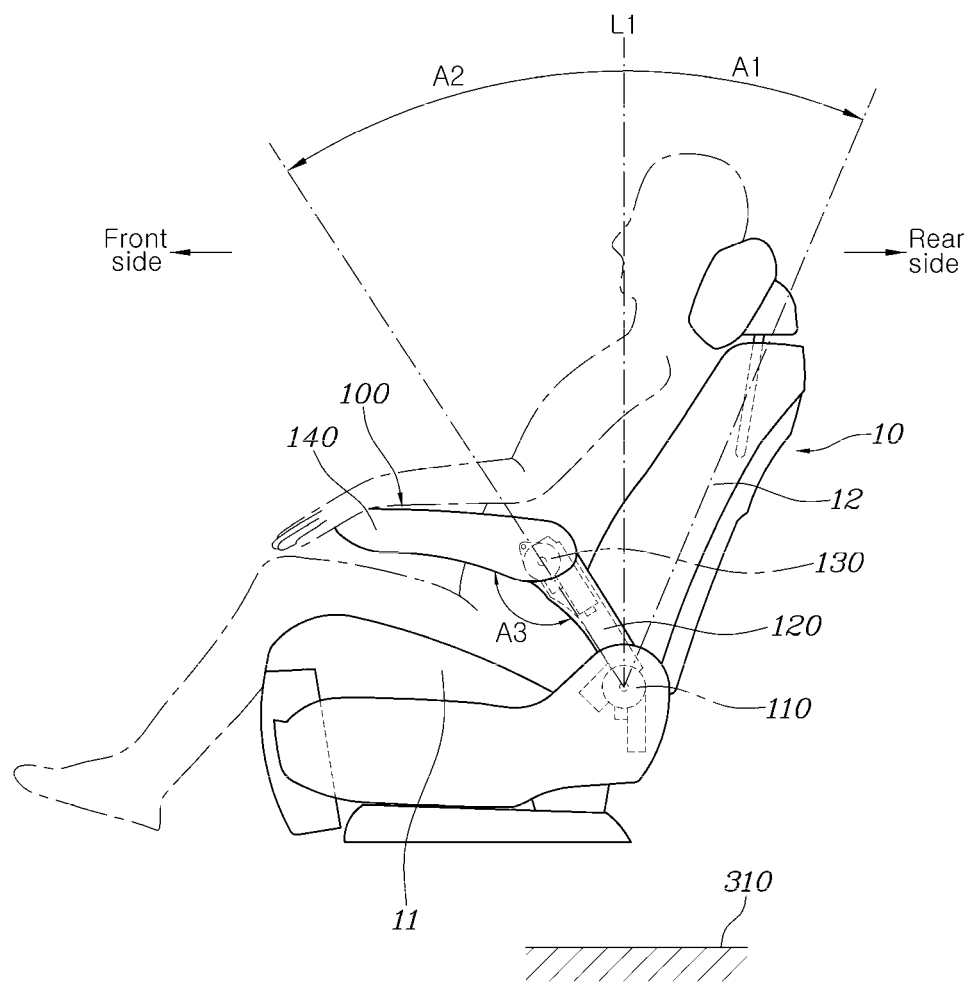

The standard posture of the seat 10, as illustrated in FIG. 7, may be defined as a state in which the seatback 12 rotates rearwards by an angle A1 within 45 degrees with respect to a vertical line L1 that is perpendicular to a ground surface 310.

Further, the standard mode of the armrest 100 may be defined as a state in which the lower arm 120 rotates to the front side by an angle within 45 degrees with respect to the vertical line L1 and the upper arm 140 rotates toward the front side while the included angle A3 between the upper arm 140 and the lower arm 120 is an obtuse angle.

Figure 8:
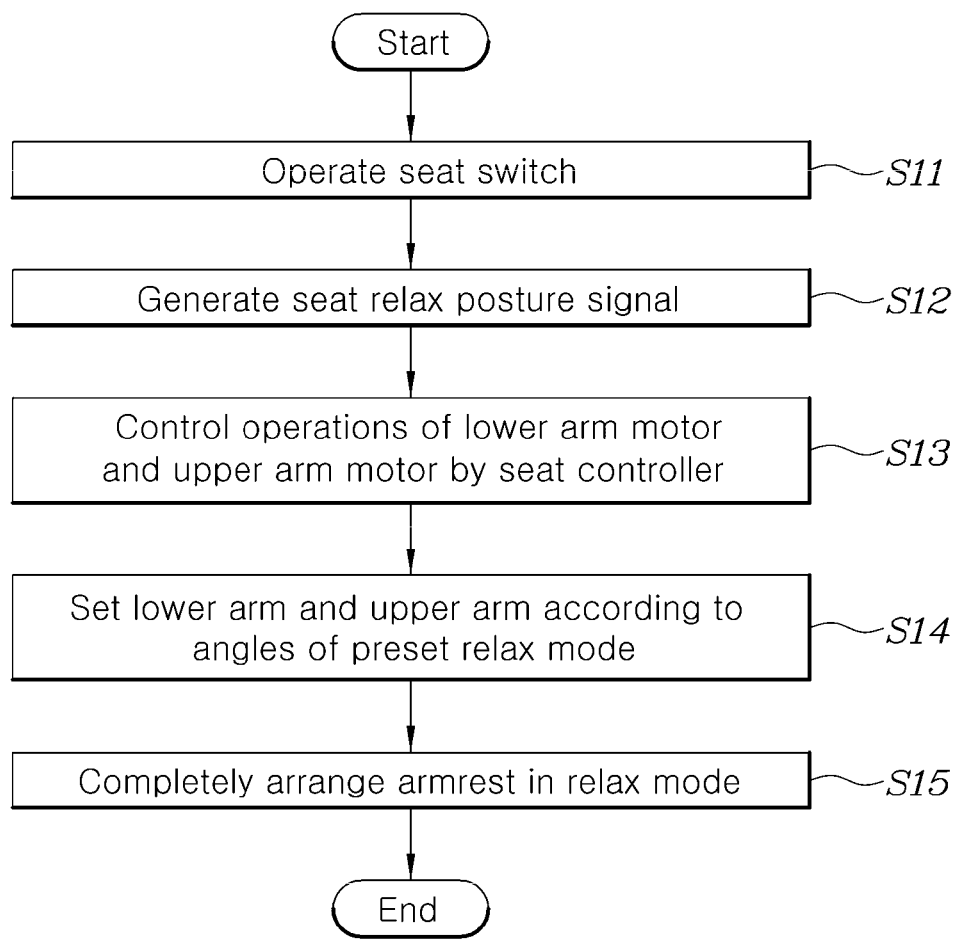
FIGS. 8 and 9 are a flowchart and an operational state view for explaining a situation in which the armrest apparatus is arranged in a relax mode according to an exemplary embodiment of the present disclosure.

Next, a configuration of arranging the armrest apparatus 100 in a relax mode when the seat 10 maintains the relax posture will be described with reference to FIG. 8.

If a relax posture signal of the seat 10 is generated (step S12) as a passenger manipulates the seat switch 250 (step S11), the seat controller 240 individually controls operations of the lower arm motor 110 and the upper arm motor 130 (step S13).

If the relax posture signal of the seat 10 is generated by manipulating the seat switch 250, the seat controller 240 calculates the locations of the lower arm 120 and the upper arm 140 and angles that are necessary for rotations of the lower arm 120 and the upper arm 140 by utilizing Hall sensors of the lower arm motor 110 and the upper arm motor 130.

If the lower arm motor 110 and the upper arm motor 130 are operated according to the control of the seat controller 240, the lower arm 120 and the upper arm 140 rotates to be set according to the angles of the relax mode set by the seat controller 240 (step S14), and through this, the armrest 100 can be completely arranged in the relax mode (step S15).

Figure 9:
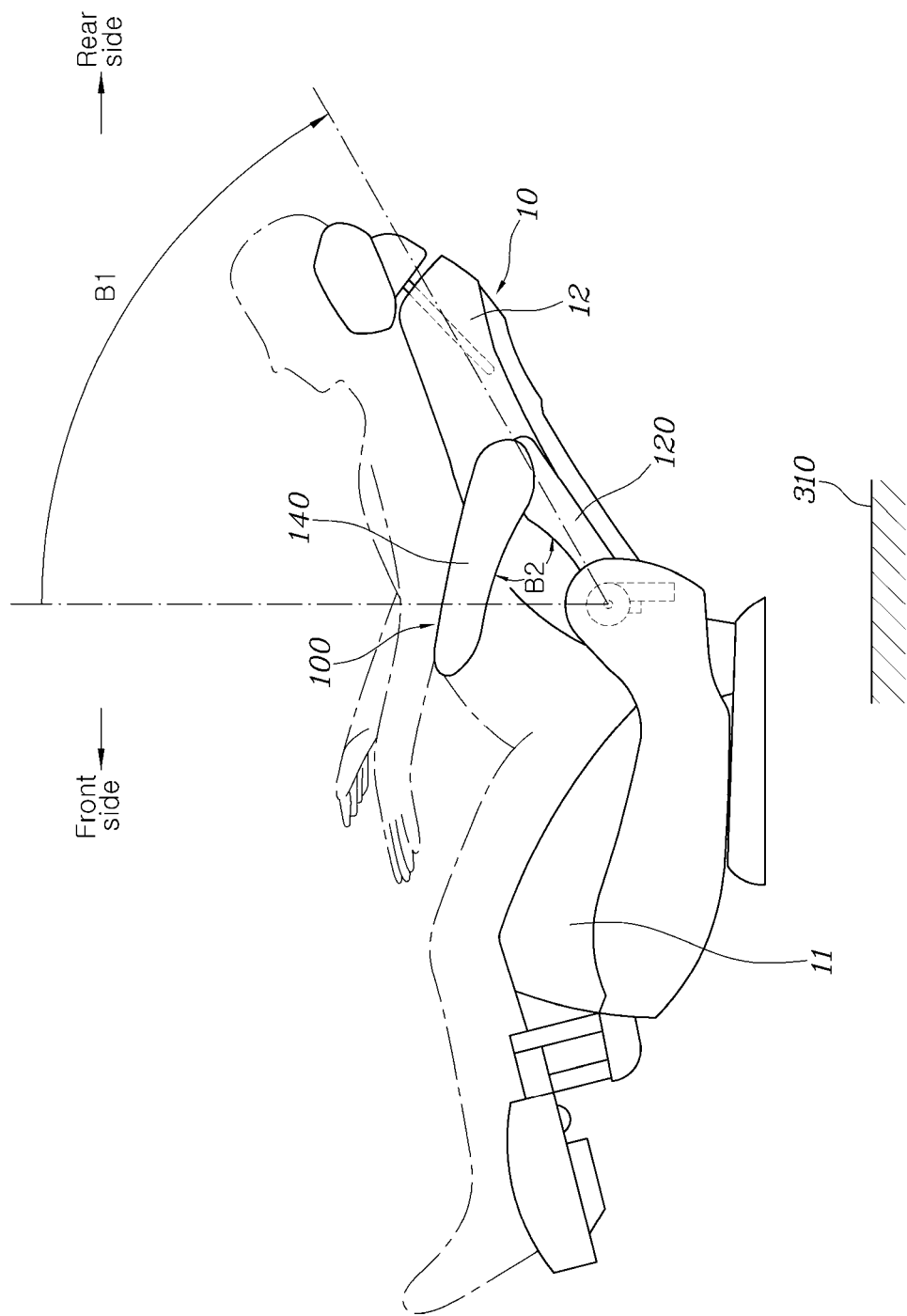

The relax posture of the seat 10, as illustrated in FIG. 9, may be defined as a state in which the seatback 12 rotates rearwards by an angle B1 of not less than 60 degrees and not more than 90 degrees with respect to a vertical line L1 that is perpendicular to a ground surface 310.

Further, the relax mode of the armrest 100 corresponds to a state in which the lower arm 120 rotates by an angle that is the same as the angle of the seatback 11 and may be defined as a state in which the upper arm 140 rotates toward the front side while the included angle B2 between the upper arm 140 and the lower arm 120 is an acute angle of not less than 30 degrees and not more than 45 degrees.

Figure 10:
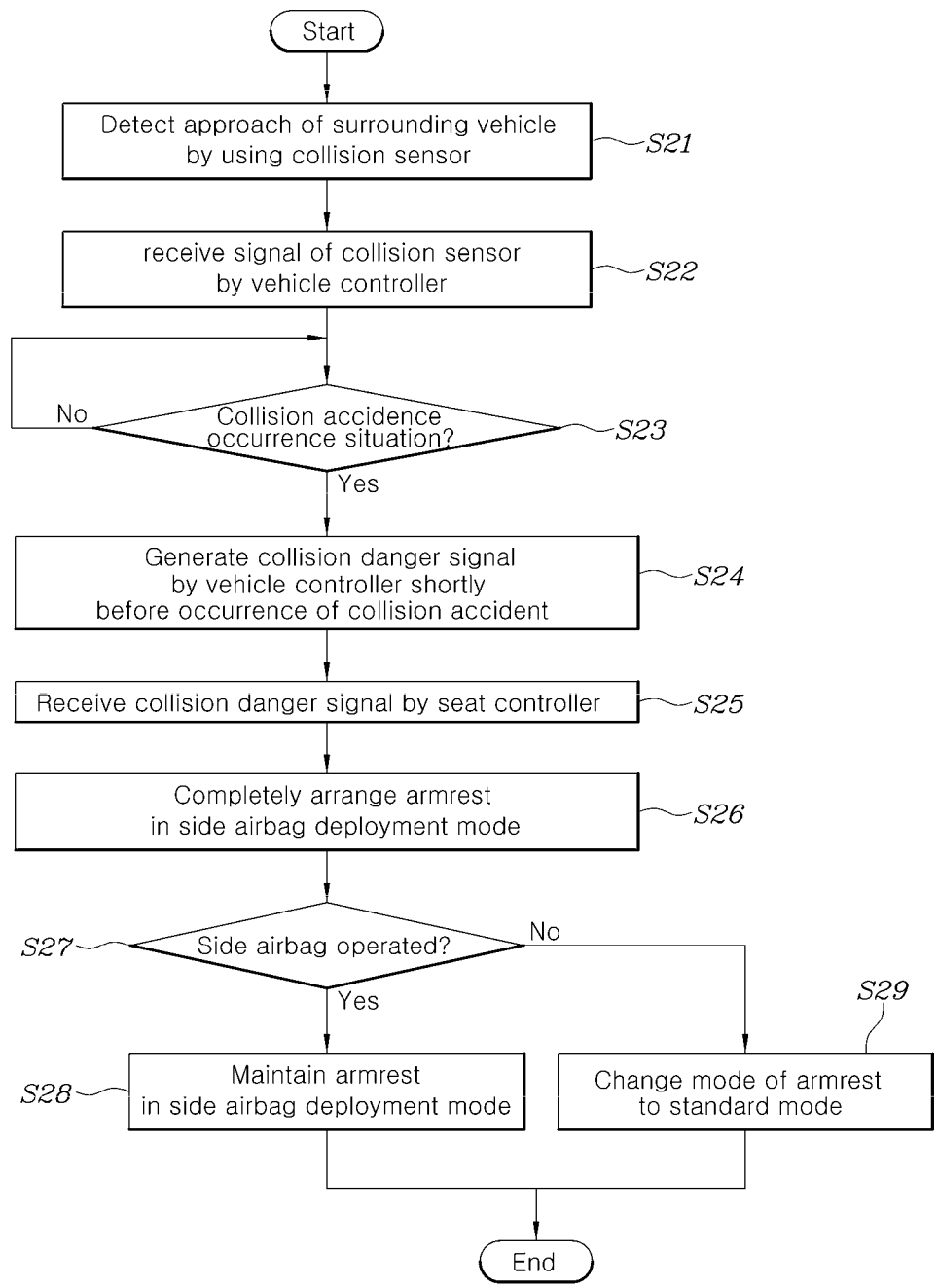
FIGS. 10 and 11 are a flowchart and an operational state view for explaining a situation in which the armrest apparatus is arranged in a side airbag deployment mode according to an exemplary embodiment of the present disclosure.

Next, a configuration of arranging the armrest apparatus 100 in a side airbag deployment mode in a situation in which a collision accident may occur will be described with reference to FIG. 10.

If the vehicle starts to travel, the collision sensor 210 provided in the vehicle detects an approach of the vehicle located close to the surroundings in real time (step S21), a signal detected through the collision sensor 210 is delivered to the vehicle controller 230 in real time (step S22), and the vehicle controller 230 determines whether there is a danger of a collision accident by using the signal delivered from the collision sensor 210 (step S23).

The collision sensor 230 includes at least one of an airbag sensor, a radar system, a LIDAR system, or a camera.

When a surrounding vehicle approaches the vehicle by a preset distance or less, the vehicle controller 230 determines that there is a danger of a collision accident, and then, the vehicle controller 230 generates a collision danger signal (step S24).

The present distance may be appropriately determined in consideration of factors such as type and/or size of the vehicle, safety standards, etc. For example, the present distance may be determined within a range from 10 m to 20 m for sedans.

If the vehicle controller 230 determines that there is no danger of a collision accident in step S23, the logic of the present disclosure is fed back to the steps before step S23.

The collision danger signal generated in step S24 is delivered to the seat controller 240 before a collision accident is generated (step S25), the seat controller 240 individually controls the operations of the lower arm motor 110 and the upper arm motor 130 on the basis of the collision danger signal, and the lower arm 120 and the upper arm 140 are rotated to be set according to the angle of the side airbag deployment mode set by the seat controller 240, and through this, the armrest 100 is completely arranged in the side airbag deployment mode (step S26).

If the collision danger signal is generated in step S24 through the determination of the step S23, the armrest 100 is arranged in the side airbag deployment mode before a collision accident occurs.

Subsequently, according to an exemplary embodiment of the present disclosure, it is determined whether the side airbag has been operated within a predetermined period of time (a period of time determined in consideration of a deployment time of the side airbag) after the armrest 100 is completely arranged in the side airbag deployment mode as in step S26 (step S27). When it is determined in the determination result that the side airbag has been operated, the armrest 100 continues to maintain the side airbag deployment mode (step S28). On the other hand, when it is determined that the side airbag has not been operated, the mode of the armrest 100 is changed from the side airbag deployment mode to the standard mode through an operation by control of the seat controller 240 and the armrest 100 is arranged in the standard mode (step S29).

Figure 11:
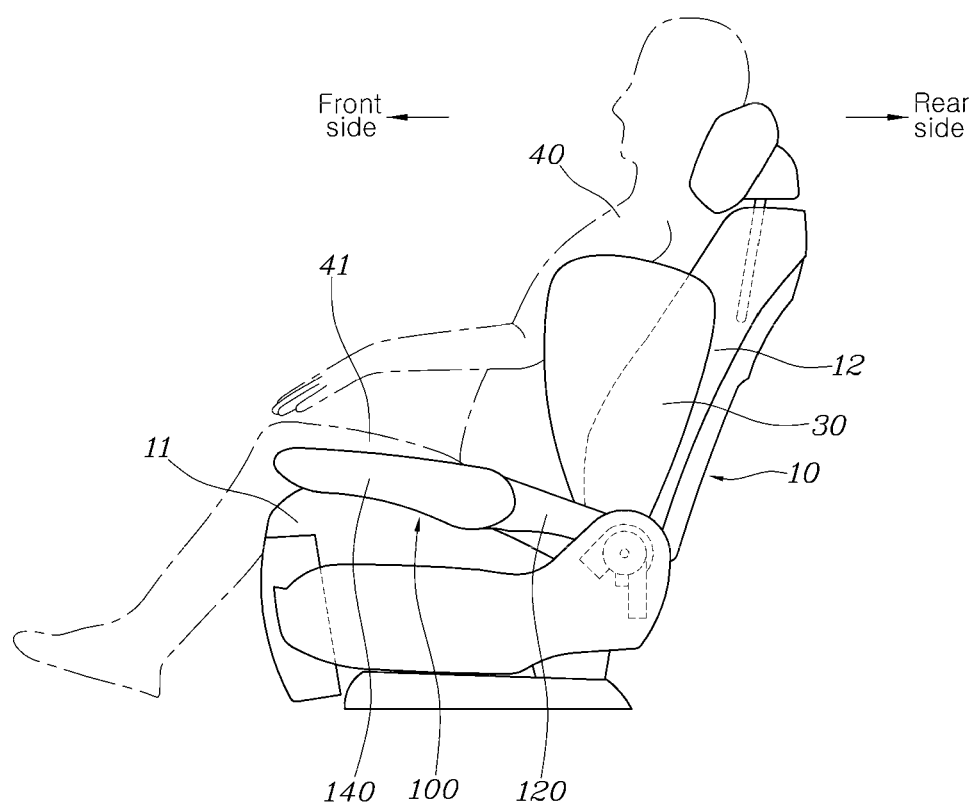

Here, the side airbag deployment mode of the armrest 100, as illustrated in FIG. 11, corresponds to a state in which the armrest 100 rotates to avoid a deployment area of the side airbag 30 deployed from a side surface of the seatback 12, and may be defined as a state in which the lower arm 120 and the upper arm 140 extend in a straight line along a femoral region 41 of a seated passenger 40 while being located on a side of the femoral region 41 and an end of the upper arm 140 rotates to face the front side.

Figure 12:
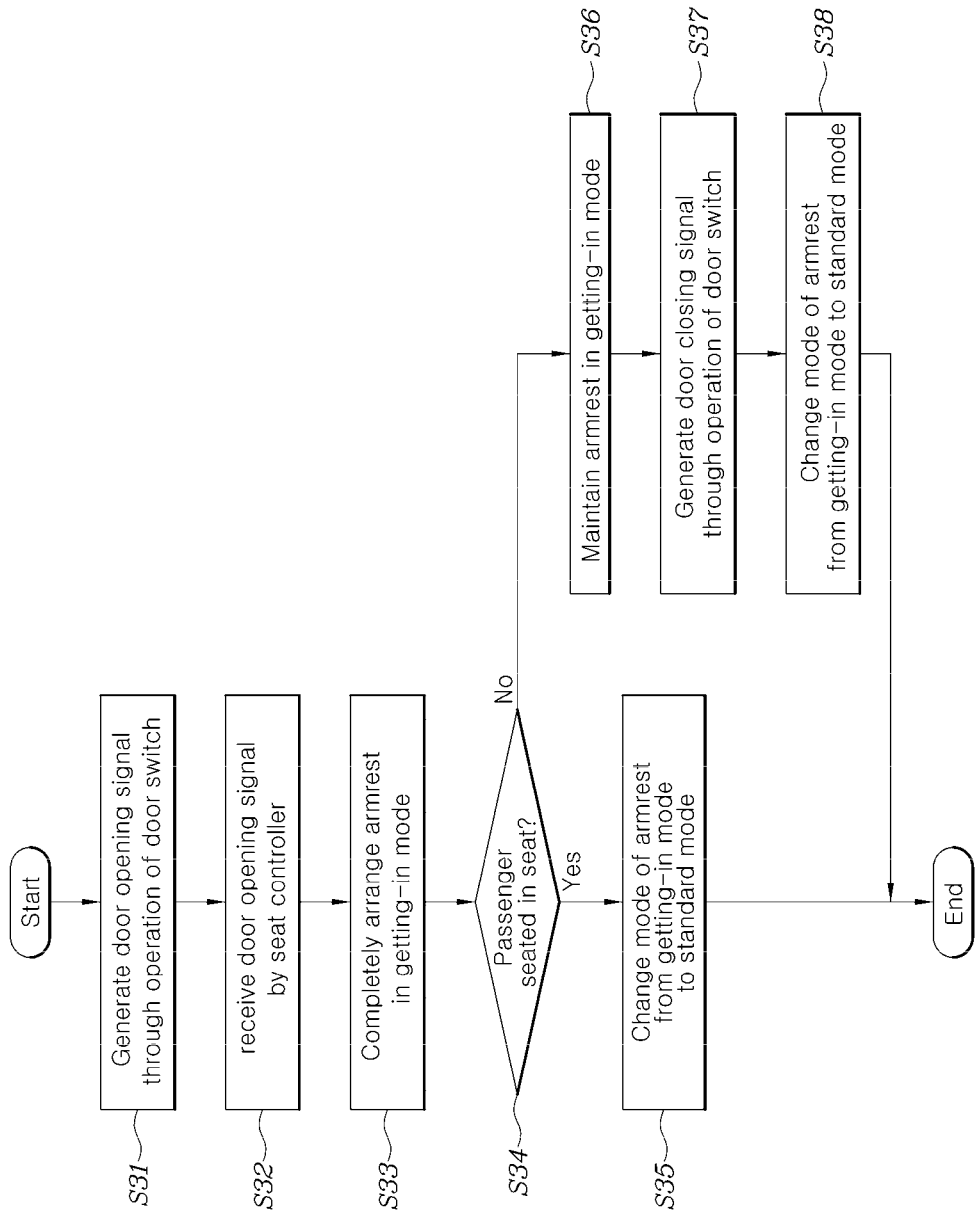
FIGS. 12 and 13 are a flowchart and an operational state view for explaining a situation in which the armrest apparatus is arranged in a getting-in mode according to an exemplary embodiment of the present disclosure.

A configuration of arranging the armrest apparatus 100 in a getting-in mode when a passenger gets in the vehicle will be described with reference to FIG. 12.

If a door is opened for riding of a passenger in a stop state of the vehicle, a door opening signal is generated by an operation of a door switch 220 (step S31), and then, the door opening signal is delivered to the seat controller 240 through the vehicle controller 230 (step S32).

If the seat controller 240 receives the door opening signal, the seat controller 240 individually controls the operations of the lower arm motor 110 and the upper arm motor 130 on the basis of the door opening signal, and the lower arm 120 and the upper arm 140 are rotated to be set according to the angle of the getting-in mode set by the seat controller 240, and through this, the armrest 100 is completely arranged in the getting-in mode (step S33).

Subsequently, according to an exemplary embodiment of the present disclosure, the seat controller 240 determines whether a passenger is seated in the seat 10 (step S34) by using a signal of the weight sensor 260 provided in the seat for a predetermined period of time (a time determined in consideration of opening of the door) after the armrest 100 is completely arranged in the getting-in mode as in step S33, and when the seat controller 240 determines in the determination result that the passenger has been seated in the seat, the mode of the armrest 100 is changed from the getting-in mode to the standard mode through an operation by control of the seat controller 240 and the armrest 100 is arranged in the standard mode (step S35).

However, when the seat controller 240 determines in the determination result in step S34 that a passenger is not seated in the seat, the armrest 100 continues to maintain the getting-in mode through control of the seat controller 240 (step S36), and if a door closing signal is generated through an operation of the door switch 220 then (step S37), the mode of the armrest 100 is changed from the getting-in mode to the standard mode through an operation by control of the seat controller 240 and the armrest 100 is arranged in the standard mode (step S38).

Figure 13:
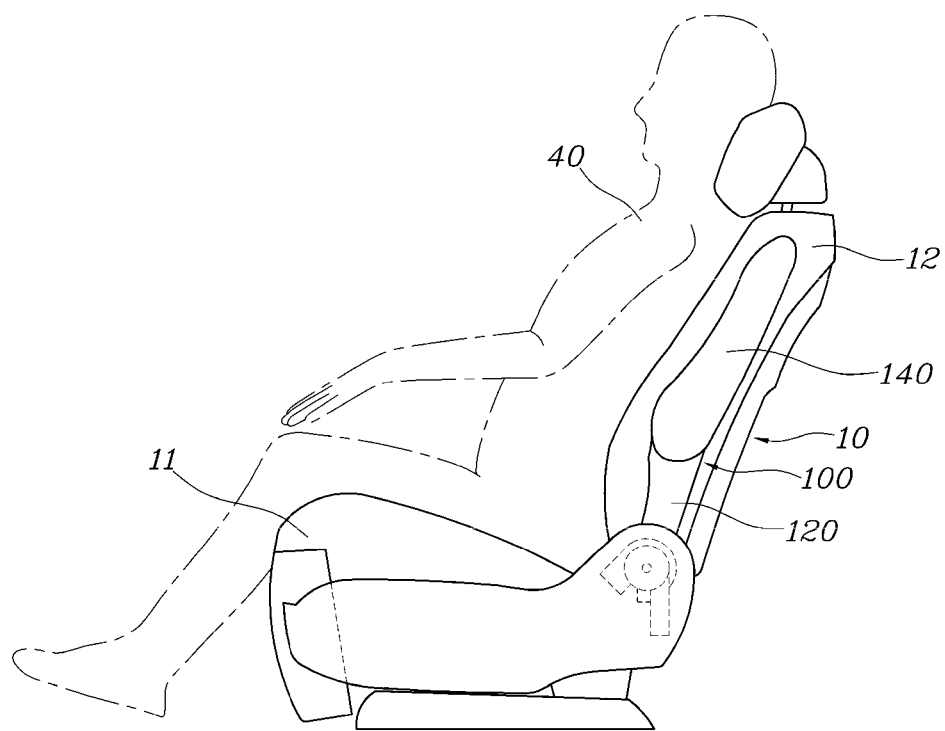

The getting-in mode of the armrest 100, as illustrated in FIG. 13, corresponds to a state in which the armrest 100 rotates to an area in which the armrest 100 does not interfere with a passenger 40 when the passenger 40 moves to a direction in which the passenger is seated in the seat 10 from a side surface of the seat 10, and may be defined as a state in which the lower arm 120 and the upper arm 140 extend in a straight line along a direction in which a seatback 12 stands uprights while being located on a side of the seatback 12 standing vertically and an end of the upper arm 140 rotates to face the upper side.

The armrest apparatus 100 according to the present disclosure may realize a getting-off mode even when the passenger gets off the vehicle, and the getting-off mode is similar to the getting-in mode, and a detailed description thereof will be omitted.

As described above, according to the present disclosure, the angle of the armrest apparatus 100 can be automatically changed variously according to a standard posture and a relax posture of the seat of the vehicle, a collision accident situation of the vehicle, and a riding situation of a passenger, and through this, the convenience of the user and the product value can be improved by expanding the useful functions of the armrest.

Further, according to the present disclosure, the armrest apparatus also may be applied to a seat of an autonomous vehicle that can realize a relax mode, in which a driver comfortably takes a rest while not directly driving the vehicle during driving of the vehicle.

Although particular embodiments of the present disclosure have been illustrated and described, it will be apparent to those skilled in the art that various modifications and changes may be made to the present disclosure without departing from the technical idea of the disclosure provided by the appended claims.

What is claimed is:

1. An armrest apparatus for a vehicle comprising:
a lower arm located on a side surface of a seat and configured to rotate with respect to the seat by power of a lower arm motor; and
an upper arm extending along a lengthwise direction of the lower arm and configured to rotate with respect to the lower arm by power of an upper arm motor,
wherein the lower arm motor is coupled to a motor bracket which is fixedly coupled to a side surface of a seat frame,
wherein the lower arm rotates with respect to the seat on a side surface of the seat when a first motor shaft of the lower arm motor, which is coupled to the lower arm, rotates,
wherein the upper arm motor is coupled to the lower arm,
wherein a second motor shaft of the upper arm motor is coupled to the upper arm such that the upper arm rotates with respect to the lower arm when the second motor shaft rotates, and
wherein the upper arm motor is coupled to the lower arm disposed in an empty space inside the lower arm so as to be prevented from being exposed to outside.

2. The armrest apparatus of claim 1, wherein the lower arm motor extends toward one side of the lower arm, and an extending portion of the lower arm motor is covered by a seat shield side cover coupled to the seat to be prevented from being exposed to outside.

3. The armrest apparatus of claim 1,
wherein the second motor shaft extends through the lower arm to be integrally combined with the upper arm through a coupling nut.

4. The armrest apparatus of claim 1, wherein operations of the lower arm motor and the upper arm motor are individually controlled by a seat controller.

5. The armrest apparatus of claim 1, further comprising a mobile device cradle, which is configured to cradle a mobile device, slidably disposed in the upper arm,
wherein the mobile device cradle slides out from the upper arm in a lengthwise direction of the upper arm, such that a front side of the mobile device cradle is exposed outside to support the mobile device for charging.

6. A method for controlling an operation of the armrest apparatus of claim 5, the method comprising:
generating a standard posture signal of the seat through control of a seat switch; and
arranging, by the seat controller, the armrest in a standard mode by setting angles of the lower arm and the upper arm to preset angles by individually controlling operations of the lower arm motor and the upper arm motor when the standard posture signal is generated.

7. The method of claim 6, wherein a standard posture of the seat corresponds to a state in which a seatback rotates rearwards by an angle within 45 degrees with respect to a vertical line that is perpendicular to a ground surface, and
wherein the standard mode of the armrest corresponds to a state in which the lower arm rotates forwards by an angle within 45 degrees with respect to the vertical line and the upper arm rotates forwards while maintaining an angle between the upper arm and the lower arm to be an obtuse angle.

8. A method for controlling an operation of the armrest apparatus of claim 5, the method comprising:
generating a relax posture signal of the seat through control of a seat switch; and
arranging, by the seat controller, the armrest in a relax mode by setting angles of the lower arm and the upper arm to preset angles by individually controlling operations of the lower arm motor and the upper arm motor when the relax posture signal is generated.

9. The method of claim 8, wherein a relax posture of the seat corresponds to a state in which a seatback rotates rearwards by an angle between 60 degrees 90 degrees with respect to a vertical line that is perpendicular to a ground surface, and
wherein the relax mode of the armrest corresponds to a state in which the lower arm rotates by an angle that is the same as the angle of the seatback and the upper arm rotates forwards while an angle between the upper arm and the lower arm is an acute angle between 30 degrees and 45 degrees.

10. A method for controlling an operation of the armrest apparatus of claim 5, the method comprising:
detecting, by a collision sensor, an approach of a surrounding vehicle when the vehicle is in motion;
generating, by a vehicle controller, a collision danger signal before a collision accident occurs when the collision sensor detects the approach to determine a danger of a collision accident by the vehicle controller; and
arranging, by the seat controller, the armrest in a side airbag deployment mode by setting angles of the lower arm and the upper arm to preset angles by individually controlling operations of the lower arm motor and the upper arm motor when the collision danger signal is generated.

11. The method of claim 10, further comprising:
continuing the side airbag deployment mode, by the armrest, when a side airbag is operated within a predetermined period of time after the armrest is arranged in the side airbag deployment mode; and
changing the side airbag deployment mode to the standard mode by control of the seat controller, when the side airbag is not operated within the predetermined period of time after the armrest is arranged in the side airbag deployment mode,
wherein when the collision danger signal is generated, the armrest is arranged in the side airbag deployment mode before the collision accident occurs.

12. The method of claim 11, wherein the standard mode of the armrest corresponds to a state in which the lower arm rotates forwards by an angle within 45 degrees with respect to a vertical line that is perpendicular to a ground surface, and corresponds to a state in which the upper arm rotates forwards while maintaining an angle between the upper arm and the lower arm to be an obtuse angle.

13. The method of claim 10, wherein the collision sensor comprises at least one of an airbag sensor, a radar system, a LIDAR system, or a camera, and
wherein the vehicle controller generates the collision danger signal when the surrounding vehicle approaches the vehicle by a preset distance or less.

14. The method of claim 10, wherein the side airbag deployment mode of the armrest corresponds to a state in which the armrest rotates to avoid a deployment area of the side airbag deployed from a side surface of the seatback, and corresponds to a state in which the lower arm and the upper arm extend in a straight line along a femoral region of a seated passenger while being located on a side of the femoral region and the upper arm rotates forwards such that an end thereof protrudes forwards.

15. A method for controlling an operation of the armrest apparatus of claim 5, the method comprising:
generating a door opening signal through an operation of a door switch in a stop state of the vehicle; and
arranging, by the seat controller, the armrest in a getting-in mode by setting angles of the lower arm and the upper arm to preset angles by individually controlling operations of the lower arm motor and the upper arm motor when the door opening signal is generated.

16. The method of claim 15, further comprising:
determining, by the seat controller, whether a passenger is seated on the seat by using a signal of a weight sensor disposed in the seat for a predetermined period of time after the armrest is arranged in the getting-in mode; and
upon determining that the passenger is seated, changing the getting-in mode of the armrest to a standard mode by control of the seat controller.

17. The method of claim 15, further comprising:
determining, by the seat controller, whether a passenger is seated on the seat by using a signal of a weight sensor disposed in the seat for a predetermined period of time after the armrest is arranged in the getting-in mode;
upon determining that a passenger is not seated in the seat, continuing the getting-in mode of the armrest through control of the seat controller; and
when a door closing signal is generated through an operation of the door switch in a situation in which the armrest continues the getting-in mode while a passenger is not seated in the seat, changing the getting-in mode of the armrest to a standard mode through an operation by control of the seat controller.

18. The method of claim 15, wherein the getting-in mode of the armrest corresponds to a state in which the armrest rotates to an area in which the armrest does not interfere with a passenger when the passenger moves to a direction in which the passenger is seated in the seat from the side surface of the seat, and corresponds to a state in which the lower arm and the upper arm extend in a straight line along a direction in which a seatback stands uprights while being located on a side of the seatback standing vertically and the upper arm rotates upwards such that an end thereof protrudes upwards.

19. The method of claim 15, wherein the standard mode of the armrest corresponds to a state in which the lower arm rotates forwards by an angle within 45 degrees with respect to a vertical line that is perpendicular to a ground surface, and corresponds to a state in which the upper arm rotates forwards while maintaining an angle between the upper arm and the lower arm to be an obtuse angle.

* * * * *